Nov. 11, 1969  A. ROSS  3,477,741
HANDLEBAR ASSEMBLIES FOR BICYCLES
Filed Dec. 11, 1967  2 Sheets-Sheet 2
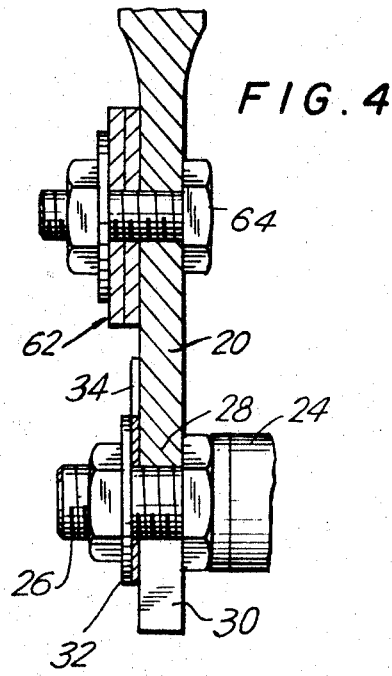
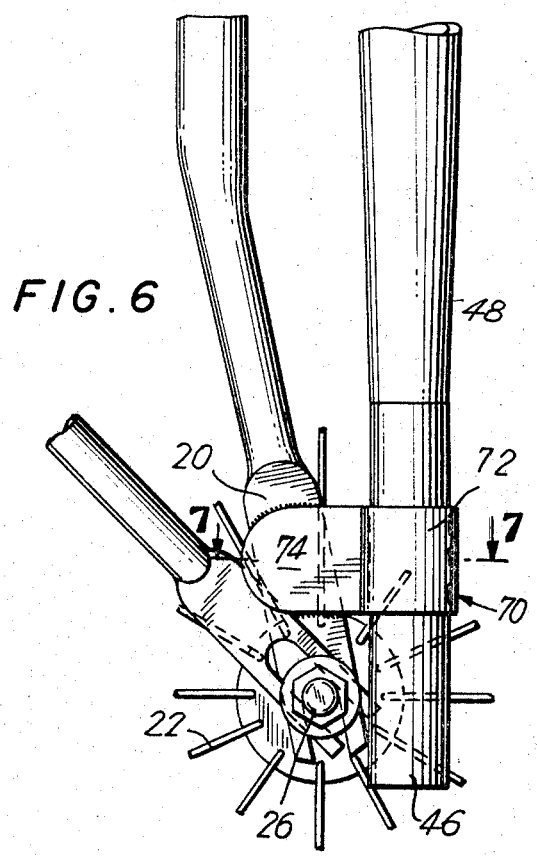
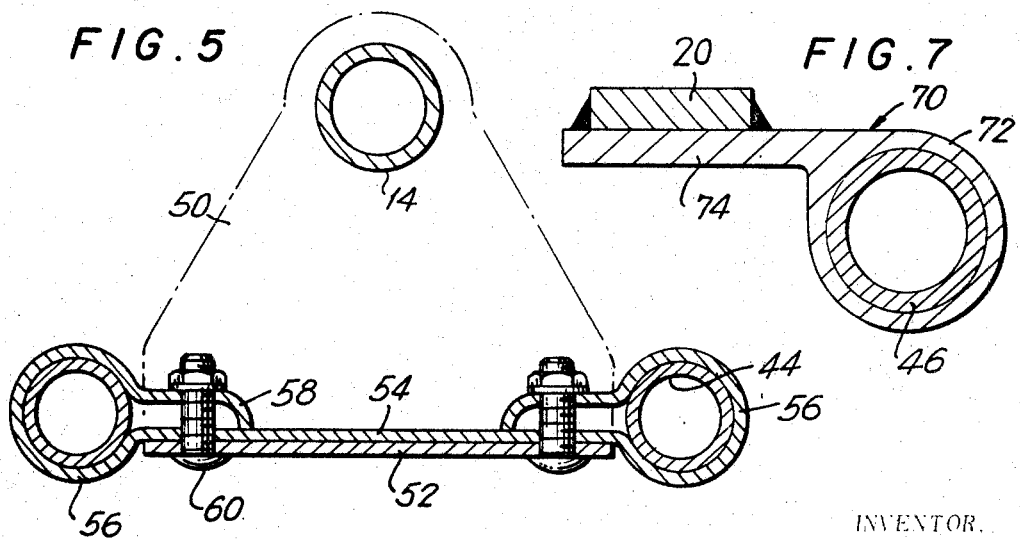
INVENTOR.
ALBERT ROSS
BY Percy Freeman
ATTORNEY

United States Patent Office 3,477,741
Patented Nov. 11, 1969

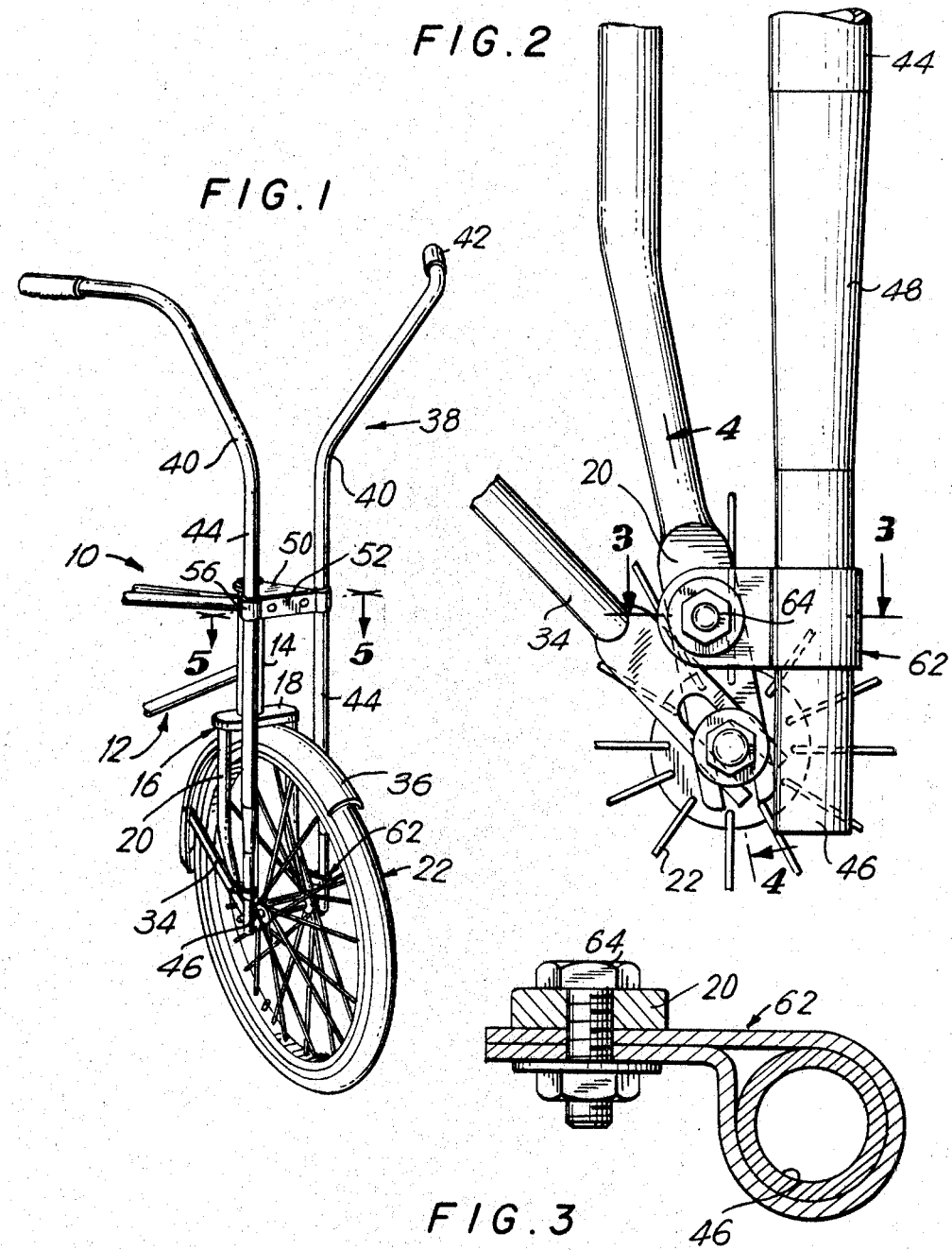

3,477,741
HANDLEBAR ASSEMBLIES FOR BICYCLES
Albert Ross, 7 Leonard Drive,
East Rockaway, N.Y. 11518
Filed Dec. 11, 1967, Ser. No. 689,442
Int. Cl. B62k 21/12, 21/02
U.S. Cl. 280—279                                    4 Claims

ABSTRACT OF THE DISCLOSURE

A bicycle having a frame which supports at its front end a fork for swiveling movement with respect to the frame, this fork having a lower axle-engaging portion to be connected to the axle of a front wheel of the bicycle. High-rise type handlebars, providing the bicycle with motorcycle type of handlebars, are provided for steering the bicycle, and a connecting means connects these handlebars to the fork means. The connecting means connects the handlebars to the fork means at a location spaced from the axle-engaging portion thereof, and in addition the connecting means connects the individual handlebars to the fork means for separate adjustment with respect thereto, each handlebar being individually adjustable both angularly and in elevation.

BACKGROUND OF THE INVENTION

The present invention relates to bicycles.

In particular, the present invention relates to handlebar assemblies for bicycles.

There are at the present time known bicycles which have high-rise type of handlebars, providing the bicycle with a motorcycle type of handlebar construction. Such high-rise type of handlebars conventionally include individual handlebar units connected to the bicycle for steering the latter. However, handlebar constructions of this type, as they are presently known and used, have several disadvantages.

Such handlebar units are conventionally connected directly to the front wheel axle along with the fork at the front of the bicycle, so that undesirable complications are involved in connection with adapting the front axle to accommodate not only the fork but also the handlebar structure. Furthermore, with handlebars of this general type there is practically no possibility of adjusting the positions of the handlebars so as to adapt them to the characteristics of a particular operator. It is very frequently desirable to be able to adjust the handlebars angularly and in elevation, and this possibility is not present with known handlebar constructions of the above type.

SUMMARY OF THE INVENTION

It is accordingly a primary object of the present invention to provide a bicycle which has high-rise handlebars of the motorcycle type but which at the same time will avoid the above drawbacks of the known constructions.

In particular, it is an object of the present invention to provide a structure of this type which will not in any way interfere with the conventional connection of the front axle of the bicycle to the fork thereof as well as to elements such as braces for the fender of the front wheel.

In addition, it is an object of the present invention to provide a construction of this type which enables the handlebar assembly to be adjusted.

Also, it is an object of the invention to provide a construction where the handlebar assembly can be adjusted not only in elevation but also angularly.

An additional object of the invention is to provide a construction where, in an extremely convenient manner, it is possible to adjust each handlebar separately from the other both in elevation and angularly.

Furthermore, the objects of the present invention include the provision of a structure which is capable of accomplishing the above objects while being composed of simple, rugged elements which are inexpensive to assemble and manufacture and which are very reliable in operation.

With the bicycle of the invention, the frame means of the bicycle has a front end where the fork means is located, this fork means being carried by the frame means at its front end for swiveling movement with respect to the frame means. As is well known, the fork means has a lower axle-engaging portion which is adapted to be connected with the axle of the front wheel so that when the fork is swiveled the front wheel will turn to steer the vehicle. A handlebar means of the high-rise type is provided for steering the bicycle, and a connecting means connects the handlebar means to the fork means at a location spaced from the axle-engaging portion of the fork means. In this way, the handlebar means is completely separate from the front axle and creates no problems in connection with the latter. This connecting means of the invention connects the handlebar means to the fork means not only to provide swiveling of the fork means in response to turning of the handlebar means by the operator, but also to provide for adjustment of the handlebar means both in elevation and angularly, so that the handlebar means of the invention can be adapted to the requirements of a particular operator.

BRIEF DESCRIPTION OF THE DRAWINGS

The invention is illustrated by way of example in the accompanying drawings which form part of this application and in which:

FIG. 1 is a perspective front elevation fragmentarily illustrating a bicycle of the invention at the front part of the bicycle where the structure of the invention is situated.

FIG. 2 is a fragmentary side elevation showing, at an enlarged scale as compared to FIG. 1, the details of the connection of the handlebar means to the fork means.

FIG. 3 is a sectional plan view taken along line 3—3 of FIG. 2 in the direction of the arrows and showing, at an enlarged scale as compared to FIG. 2, further details of the connecting means of the invention.

FIG. 4 is a transverse sectional elevation taken along line 4—4 of FIG. 2 in the direction of the arrows and showing, also at an enlarged scale as compared to FIG. 2, further details of the connecting structure of the invention.

FIG. 5 is a sectional plan view taken along line 5—5 of FIG. 1 in the direction of the arrows and showing, at a scale larger than FIG. 1, details of the structure of the connecting means for connecting the handlebars to an upper part of the fork means.

FIG. 6 is a fragmentary side elevation, similar to FIG. 2, but showing another embodiment of the structure of the invention.

FIG. 7 is a sectional plan view, similar to FIG. 3, taken along lines 7—7 of FIG. 6, and showing details of the connecting structure of FIG. 6.

DESCRIPTION OF PREFERRED EMBODIMENTS

Referring now to the drawings, there is shown in FIG. 1, the front end of a bicycle 10 which has a frame means 12 provided at its front end with a head tube 14 through which an upper stem of the fork means 16 extends so as to be capable of swiveling movement in the tube 14, as is well known.

The stem of the fork means 16 is fixed at its lower end to a transverse plate 18 of the fork means 16, and this transverse plate is in turn fixed at its outer end portions to the upper ends of a pair of fork arms 20 which extend downwardly from the transverse plate 18 and which define between themselves a space for the upper portion of the front wheel 22 of the bicycle, as is well known. The front wheel 22 is, of course, supported for rotary movement by an axle assembly 24 (FIG. 4), and this axle assembly has an outer threaded end portion 26 extending through a lower axle-engaging portion 28 of each arm 20, this lower axle-engaging portion 28 of each arm 20 being formed with an upwardly directed notch 30 which receives the outer end 26 of the axle assembly 24. By way of a nut and washer assembly 32, each axle-engaging portion 28 of the fork means 16 is operatively connected with the axle assembly 24, and these nut and bolt assemblies 32 also serve to connect to the axle assembly braces 34 which are connected at their outer ends to a fender 36, as is well known.

As is apparent from FIG. 1, bicycle 10 has a high-rise handlebar means 38 providing the bicycle with motorcycle type handlebars, and this handlebar means 38 includes a pair of handlebar units 40 respectively terminating at their upper rear ends in the hand grips 42 which are accessible to the operator for steering the bicycle. Each unit 40 is of an elongated, fairly rigid, tubular metallic construction, and each unit 40 has a front vertically extending upright portion 44 terminating in a lower tubular end portion 46 which is of a smaller diameter than the remainder of the handlebar unit and which is connected to the remainder of the handlebar unit by a tapered transition section 48 integral with the rest of the unit, as is apparent in FIG. 2. It is emphasized that these units 40 of the handlebar means 38 are completely separate from each other, and their front upright portions 44 respectively extend along the fork means 16 with the wheel 22 also being situated between these upright portions 44 of the handlebar units 40.

The top end of the fork means 16, at the location where its stem extends above the head tube 14, is rigidly fixed with a substantially triangular bracket plate 50 which is situated in a substantially horizontal plane and which terminates at its front edge in a downwardly directed flange 52. As is shown in FIG. 5, this flange 52 has along its inner, rearwardly directed surface an elongated metallic strip 54 which interconnects a pair of clamps 56 which are made with the strip 54 of a suitable springy metal. These clamps 56 extend around the upright portions 44 of the handlebar means and terminate in springy free ends 58 which butt against the strip 54 in the manner shown in FIG. 5. Bolt-and-nut assemblies 60 extend through aligned openings of each clamp 56 and flange 52 so that the clamps 56 can be tightened on the portions 44 of the handlebar means to clamp the latter, through the bracket 50, to the fork means 16 at the region of the upper end thereof, and, of course, whenever desired the bolt-and-nut assembly 60 can be loosened for adjusting purposes, as described below. This structure, which is shown in FIG. 5, forms part of a connecting means of the invention.

This connecting means further includes, in the embodiment of FIGS. 1–4, a pair of lower brackets 62, one of which is shown in FIG. 3. Each of the lower brackets 62 is in the form of a metal strip which is curved so as to extend around and tightly engage the lower portion 46 of each handlebar unit 40, and the bracket 62 has a pair of rearwardly extending free end portions which are clamped together by a bolt-and-nut assembly 64 which passes through an opening of each fork arm 20 and aligned openings of the rear portions of each bracket 62. As is apparent, particularly from FIGS. 2–4, the brackets 62 of the connecting means of the invention connect the handlebar means 38 not to the axle but rather to portions of the fork means 16 which are spaced from the axle-engaging portions 28 thereof. Thus, as is shown in FIGS. 2 and 4, the brackets 62 of the connecting means serve to connect the handlebar units 40 to the fork means 16 at a lower portion thereof, which is situated at an elevation higher than the axle-engaging portion 28 thereof, and in this way, while the handlebar structure of the invention is rigidly and reliably connected with the fork means to transmit to the latter the turning movement provided by the operator at the handlebar means 38, nevertheless no complications are involved in connection with the axle assembly.

Furthermore, it will be noted that the pair of brackets 62 of the connecting means of the invention provide individual completely independent connections of the handlebar units 40 to the fork means while the pair of clamps 56 of the connecting means also provide completely individual connections of the handlebar units 40 to the fork means, at the upper end thereof, through the bracket 50. As a result, it is possible to loosen the clamps 56 and the brackets 62 either at one or both of the units 40 and to adjust each of these units 40 not only in elevation, longitudinally of the axis of its front upright portion 44, but also angularly with respect to this latter axis, after which the clamps 56 and the brackets 62 are tightened. Thus, it becomes possible with this construction to achieve individual adjustment of each handlebar unit 40 not only in elevation but also angularly, and thus the handlebar means 38 of the invention has a wide range of adjustment possibilities capable of adapting it to the particular requirements of any operator.

The embodiment of the invention which is illustrated in FIGS. 6 and 7 is identical to that of FIGS. 1–5 except for the structure of the brackets 62. With this embodiment, instead of brackets 62, as shown in FIGS. 2–4, the connecting means includes brackets 70 which are in the form of sleeves 72 through which the lower portions 46 of the handlebar units respectively pass, these sleeves 72 respectively having rear extensions 74 which are directly welded to the arms 20 of the fork means 16 at a location higher than the axle-engaging portions 28 thereof, as is particularly apparent from FIG. 6. The lower reduced portions 46 of the handlebar units 40 have only a relatively snug fit in the sleeves 72 so that they are capable of sliding both axially and angularly therein, and the entire fixing of the handlebar units in their adjusted positions is provided in this case by way of the clamps 56. Thus, with this embodiment in order to adjust the handlebar means 38, it is only necessary for the operator to loosen the clamps 56, after which the pair of handlebar units 40 can be individually adjusted one with respect to the other as well as with respect to the fork means 16, and then the clamps 56 are tightened to retain the handlebar means in its adjusted position. It is to be noted that in the case of FIGS. 6 and 7, also, the connecting means connects the handlebar means to the fork means at a location thereof, which is spaced from its axle-engaging portions so that in this case also there is no interference with the connecting of the structure to the axle and at the same time a wide range of adjustability of the handlebar means is maintained in a manner which is even more convenient than that of FIGS. 2–4.

What is claimed is:

1. In a bicycle, frame means having a front end, fork means carried by said frame means at said front end thereof for swiveling movement with respect thereto, said fork means having a lower axle-engaging portion for engaging and coacting with an axle of a front wheel of the bicycle to turn the front wheel, high-rise handlebar means to be turned by the operator for steering the bicycle and including a pair of individual handlebar units respectively having front elongated upright portions extending along said fork means and terminating in lower end portions, and connecting means having lower portions which respectively connect said lower end portions of said handlebar units to said fork means at an elevation higher than said axle-engaging portion of said fork means for transmitting turning movement of said handlebar means by the operator to said fork means for swiveling the latter with respect to said frame means, and said lower portions of said connecting means including a pair of brackets surrounding said lower end portions of said handlebar units and having rear portions fixed to said fork means.

2. The combination of claim 1 and wherein said rear portions of said brackets are removably fixed to said fork means.

3. The conbination of claim 1 and wherein said rear portions of said brackets are welded to said fork means.

4. The combination of claim 1 and wherein said connecting means also includes an upper bracket fixed to an upper end of said fork means and extending forwardly therefrom, and a pair of clamps engaging said handlebar units at the elevation of said upper bracket and releasably clamping said handlebar units thereto, said handlebar units being slidable in a substantially vertical direction in said lower brackets of said connecting means as well as being swivelable therein, and said clamps, when releasing the connection between said handlebar units and said upper bracket permitting said units to be individually adjusted both in elevation and angularly, after which said clamps can be tightened to maintain said handlebar units in their adjusted positions.

References Cited

UNITED STATES PATENTS

| | | | |
|---|---|---|---|
| 614,774 | 11/1898 | Spiker | 74—551.1 X |
| 3,331,617 | 7/1967 | Jacoby | 280—279 |
| 3,337,240 | 8/1967 | Rizzato | 280—279 X |

KENNETH H. BETTS, Primary Examiner

U.S. Cl. X.R.

74—551.3